No. 607,954. Patented July 26, 1898.
J. W. RANGE.
CAR FENDER.
(Application filed June 16, 1897.)

(No Model.)

WITNESSES,
Ira L. Fish
R. A. Bates

INVENTOR,
John W. Range,
BY Wilmarth H. Thurston,
Attorney.

UNITED STATES PATENT OFFICE.

JOHN W. RANGE, OF PROVIDENCE, RHODE ISLAND, ASSIGNOR TO THE CONSOLIDATED CAR FENDER COMPANY, OF SAME PLACE.

CAR-FENDER.

SPECIFICATION forming part of Letters Patent No. 607,954, dated July 26, 1898.

Application filed June 16, 1897. Serial No. 640,959. (No model.)

*To all whom it may concern:*

Be it known that I, JOHN W. RANGE, of Providence, county of Providence, in the State of Rhode Island, have invented certain new and useful Improvements in Car-Fenders; and I hereby declare the following specification, taken in connection with the accompanying drawings, forming a part of the same, to be a full, clear, and exact description thereof.

The present invention relates to fenders or guards attached to the ends of street-cars for the purpose of picking up any object which may be upon the track, and has for its object to provide a simple and efficient means for securing such a fender to the end of the car.

To that end the invention consists of the features and combinations hereinafter set forth in the claims.

Figure 1:
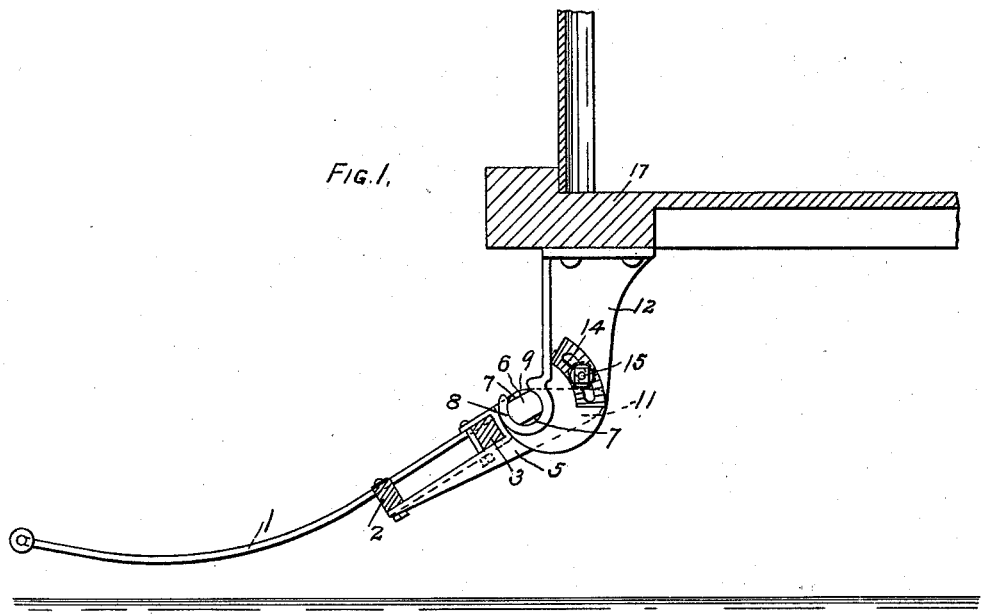
Figure 2:
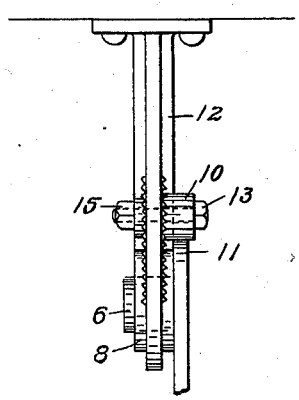

Referring to the drawings, Figure 1 is a side elevation showing an embodiment of the present invention in its preferred form. Fig. 2 is an end elevation of the bracket forming one feature of the invention.

The fender is of the same general character as the fender shown in Patent No. 574,836, granted to A. J. Thornley January 5, 1897, and consists of a series of spring-rods 1, secured to the cross-bars 2 3, said bars being carried by plate 5, one at each side of the fender, one only of which is shown. The plates 5 are provided with trunnions 6, which are flattened at 7 and fit within bearings 8, which are open at 9 to receive the flattened portions of the trunnions 6. One or both of the plates 5 projects rearwardly at 11 beyond the trunnion 6 and underlies an abutment or lug 10. With this construction the fender may be readily detached from the end of the car by turning said fender up until the flattened portions of the trunnions will pass through the openings 9, or may be readily attached to the car by passing the trunnions into the bearings 8 and letting the fender swing down until the rearwardly-projecting part 11 engages the abutment or lug 10. The fender is thus securely supported at a definite distance above the track, and yet may be readily attached or detached when desired, to shift the fender from one end of the car to the other or for any other reason.

In order that the height of the fender above the track may be varied as desired, it is preferred to make the lug 10 adjustable, and in order to simplify the construction and to make use of as few attachments and connections as possible it is preferred to form the bearing 8 in a bracket and to form the lug 10 upon or secure it to the same bracket, and such bracket forms one feature of the present improvements. As shown in the drawings, the bearing 8 is formed in a bracket 12, provided with a base-plate 12' for securing said bracket to the car 17, and the lug 10 is adjustably secured to said bracket by means of a bolt 13, passing through said lug and through a slot 14, formed in said bracket. A nut 15 is threaded upon the end of bolt 13 and serves to clamp the lug 10 in position, a washer 16 being interposed between the nut 15 and the bracket 12. The surface of the bracket 12 adjacent the slot 14 is preferably corrugated, and the lug 10 is provided with interlocking corrugations to more firmly hold said lug against displacement. In order that the brackets 12 may be used interchangeably on either side of the car, it is also preferred to corrugate both surfaces of the bracket 12 adjacent to the slot 14, as shown in Fig. 2.

What I claim as my invention, and desire to secure by Letters Patent, is—

1. The combination with a fender provided with trunnions and with a rearwardly-projecting rigid part, of open bearings for supporting said trunnions, and an independent abutment at the rear of said bearings against which said rearwardly-projecting part of the fender bears, substantially as described.

2. The combination with a fender provided with trunnions, and with a rearwardly-projecting rigid part, of open bearings for supporting said trunnions, an adjustable abutment in the rear of said bearings against which said rearwardly-projecting part of the fender bears, substantially as described.

3. A bracket provided with a base-plate for securing the same to the car, an open bearing in said bracket, and a lug adjustably secured to said bracket in the rear of said bearing, substantially as described.

4. A bracket provided with a base-plate for securing the same to the car, an open bearing in said bracket, a slot in said bracket in the rear of said bearing corrugations on the surfaces of said bracket adjacent to said slot, a lug provided with corresponding corrugations, and a bolt passing through said slot for securing said lug to said bracket, substantially as described.

JOHN W. RANGE.

Witnesses:
  W. H. THURSTON,
  R. A. BATES.